Sept. 7, 1948.  C. P. PINARDI ET AL  2,448,822
POWER TAKEOFF DRIVE UNIT

Filed Dec. 29, 1944  2 Sheets-Sheet 2

Patented Sept. 7, 1948

2,448,822

UNITED STATES PATENT OFFICE 2,448,822

POWER TAKE-OFF DRIVE UNIT

Charles P. Pinardi, Dearborn, and Harold L. Brock, Detroit, Mich., assignors to Ford Motor Company, Dearborn, Mich., a corporation of Delaware Application December 29, 1944, Serial No. 570,292

1 Claim. (Cl. 74—11)

This invention relates to agricultural tractors; and, more particularly, to the construction of power takeoff means for such tractors.

It is now usual in agricultural tractors to include one or more power takeoffs through which various implements having separate drives may be operated by power furnished by the engine of the tractor. These power takeoffs are of two general types: those comprising a direct shaft drive to an implement drawn by or positioned closely to the tractor; and those driven by means of a belt from a belt pulley on the tractor. Many tractors employ both these devices, so that the implement is available for a wide range of uses. The belt pulley, in general, is used only when the tractor is stationary and serving as a prime mover for such equipment as saws, ensilage choppers and the like. The shaft power takeoff, on the contrary, is generally used when the tractor is in motion and is used to provide the motive power for implements such as combines, mowers and the like. It will thus be apparent that it is desirable to have some means of controlling the operation of the power takeoff independently of the drive of the tractor depending upon the work to be done. Still another consideration which pertains particularly in the case of the shaft power takeoff is to provide a drive means independent of the main drive applied to the tractor wheels. Thus, in the operation of a combine, if the shaft takeoff operates conjointly with the main tractor drive, any variation in the speed of the tractor is reflected at once in the rotational speed takeoff shaft. While such variations do not markedly effect the operation of the tractor itself, they do have a profound effect upon the operation of such implements as the combine which is designed for a certain operating speed. If the rotational speed of the shaft falls below a certain range, the combine operation is no longer efficient and may cease entirely. Further, it may take considerable time to restore it to a speed adequate for operation. However, during this period the tractor is moving forward and the harvesting or other operation is performed inadequately until such time as full speed operation is resumed. Therefore, it is a prime consideration to have a takeoff shaft drive which is independent of the variations of the speed of the tractor itself so that the combine or other attached and driven implement is always supplied with power from the shaft at the speed best suited for its most efficient operation.

The advantage of the present invention is that the power takeoff drive has been directly connected with the engine of the tractor and is independent of the usual clutch or transmission arrangement through which the tractor wheels themselves are driven. Through this construction, the power takeoff shaft can be operated at a substantially constant speed under varying conditions of tractor operation. Another advantage of the present construction is that it is possible to obtain both belt and shaft power takeoffs together with an independent clutch in an extremely compact form without interfering with the remaining mechanisms. This is particularly important in tractors of the type under consideration having hydraulic actuating means for the control of implements and the regulation of drafts and the like, since this auxiliary hydraulic equipment is generally located in that portion of the tractor in which the power takeoff must also be situated. Further, the external disposition of the power takeoff means and the control means for it is so arranged as to be readily available for operation either by a driver in the tractor seat or by remote operation without interfering with the necessary external linkages required to connect the hydraulically operated implements to the tractor. Finally, in the form shown, the device is self-contained and may be readily applied or removed from the tractor without interference with the primary drive. Other advantages will be apparent from the detailed description of the device.

With these and other objects in view, this invention consists in the arrangement, construction and combination of various parts of the improved device described in the specification, claimed in the claim, and illustrated in the accompanying drawings, in which:

Figure 1:
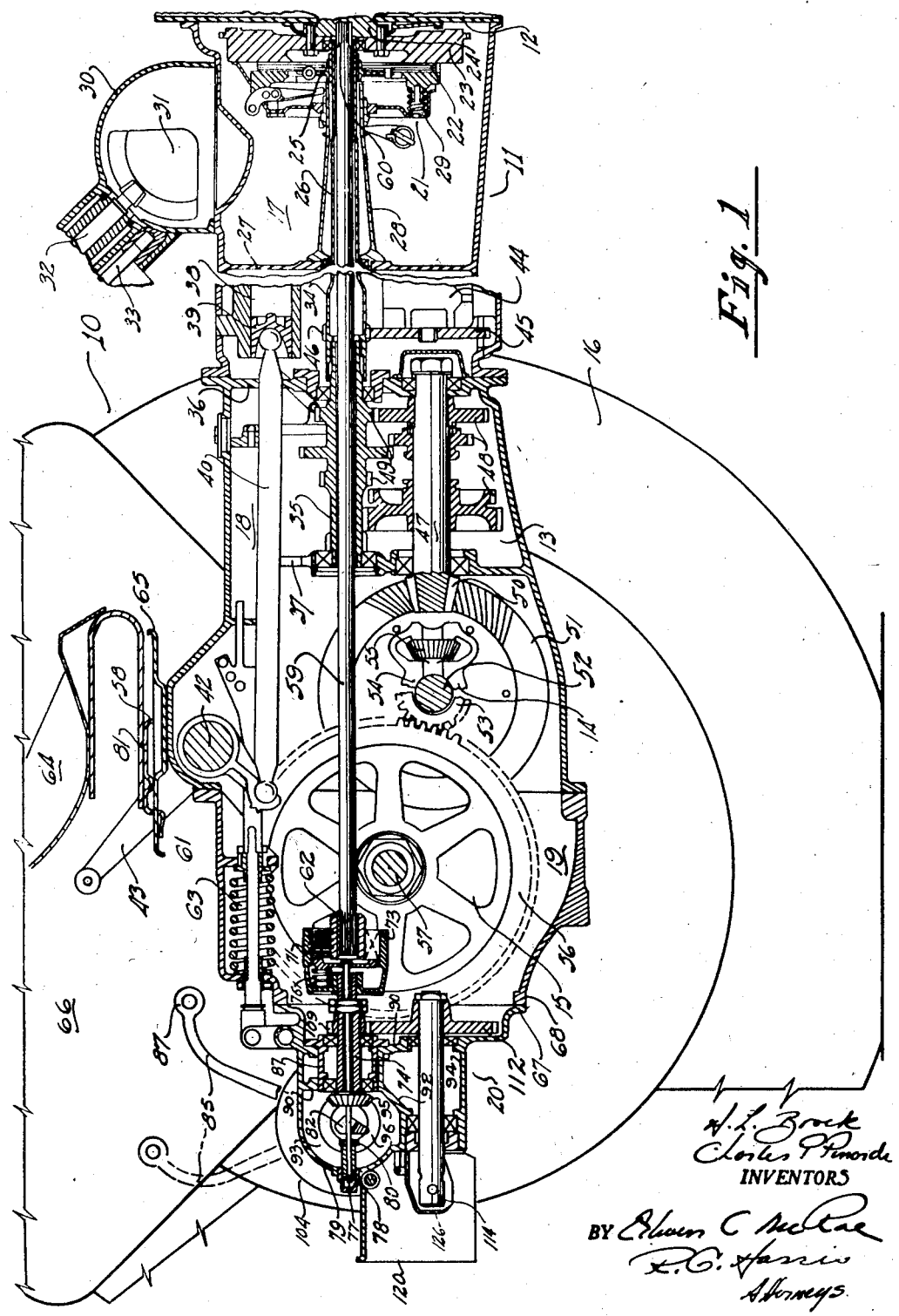
Figure 1 is a longitudinal sectional elevation through the rear portion of a tractor employing the improved construction.

Referring to Figure 1, 10 indicates a tractor of a type generally exemplified by the "Fordson" or present "Ford" tractors which have a generally tubular main structure 11 to which is attached at its forward end an engine 12 and which encloses the main drive power transfer means such as the transmission 13, clutch 21, the differential 14, the main drive 15; and serves as a support for the axles carrying the rear driving wheels 16. This tubular structure, in the present instance, comprises a clutch section 17 directly attached to the engine block 12, a transmission section 18, an axle section 19, and the power takeoff section 20, continuing rearwardly in that order. The clutch section 17 encloses a conventional semicentrifugal clutch 21, co-operating through the clutch plate 22 with the flywheel 23 which is directly bolted to the engine crankshaft 24. The driven member 25 of the clutch 21 is splined to the drive tube 26, extending rearwardly, and supported intermediate its length by suitable bearings in the clutch section transverse web 27. A tubular strut 28 lying outwardly of the drive tube 26 is supported on the transverse web 27 and secures the clutch housing 29. The steering gear housing 30 containing the steering gear 31 is attached to the upper part of the clutch section 17 and supports the steering column 32 with which is associated the control rod 33 of a steering column gearshift device. The details of the connection between this apparatus and the transmission are not shown in this application since they form no part of the present invention.

The drive tube 26 is radially enlarged at 34 and internally engages in splined relationship the hollow main transmission shaft 35 which is journaled in the forward and intermediate transverse webs 36 and 37 of the transmission section 18. A hydraulic operating cylinder 38 is also enclosed within the clutch section 17 and through the piston 39 and the rod 40 operates the hydraulic lift shaft 42, rotating the hydraulic lift arm 43 which is attached through suitable linkage, not shown, to the implement operated by the tractor. The cylinder 38 is supplied with oil from a pump 44 driven through the gear 45 from the pinion 46 formed integrally on the exterior of the enlarged section 34 of the drive tube 26.

The transmission 13 is of the usual sliding gear type having a driven shaft 47 journaled similarly to the main shaft 35 and carrying the gears 48, which mesh selectively with corresponding gears 49 integrally formed on the hollow main transmission shaft 35. The driven shaft 47 terminates rearwardly in the spiral bevel pinion 50 which meshes with the spiral bevel gear 51 mounted on the cross shaft 52. The main drive pinions 53 are also mounted on each side on the cross shaft 52 and are differentially driven through the differential carrier 54 and its associated differential gearing 55. The main drive pinions 53, in turn, mesh with the main drive gears 56 which are secured to the axles 57, leading directly to each wheel 16. This completes the power train for the main tractor drive.

It has been noted above that the drive tube 26 and the main transmission shaft 35 were both hollow, the purpose of this being to accommodate the power takeoff drive shaft 59, which is directly splined at its forward end 60 to the crankshaft 24 of the engine and continues rearwardly therefrom through the drive tube 26 and the main transmission shaft 35 past the axles 57, where it is splined to the takeoff clutch block 62. It will thus be apparent that the power takeoff drive shaft 59 is driven directly from the engine 12 and is not affected by the main clutch 21 or the transmission 13, although it passes through both of them. The remainer of the power takeoff drive mechanism will be described in connection with Figures 2 and 3 below. However, Figure 1 also shows the spring compensating means 63, which is operated by a compression link attached to the draft implement which, in turn, controls the operation of the hydraulic cylinder 38, according to the method generally known as the "Ferguson" System. Also mounted on the transmission section 18 are a seat 64 which is adjustably secured on the plate 65, and the guards 66. The plate 65 has a slot receiving the rear end 61 of a locking device 81 and a number of spaced holes in which the forward end 58 of the device 81 may be selectively engaged to obtain longitudinal adjustment. When unoccupied, the seat may be moved so that forward end 58 can be inserted in one of the spaced holes and will be retained there subsequently by the weight of the occupant.

Figure 2:
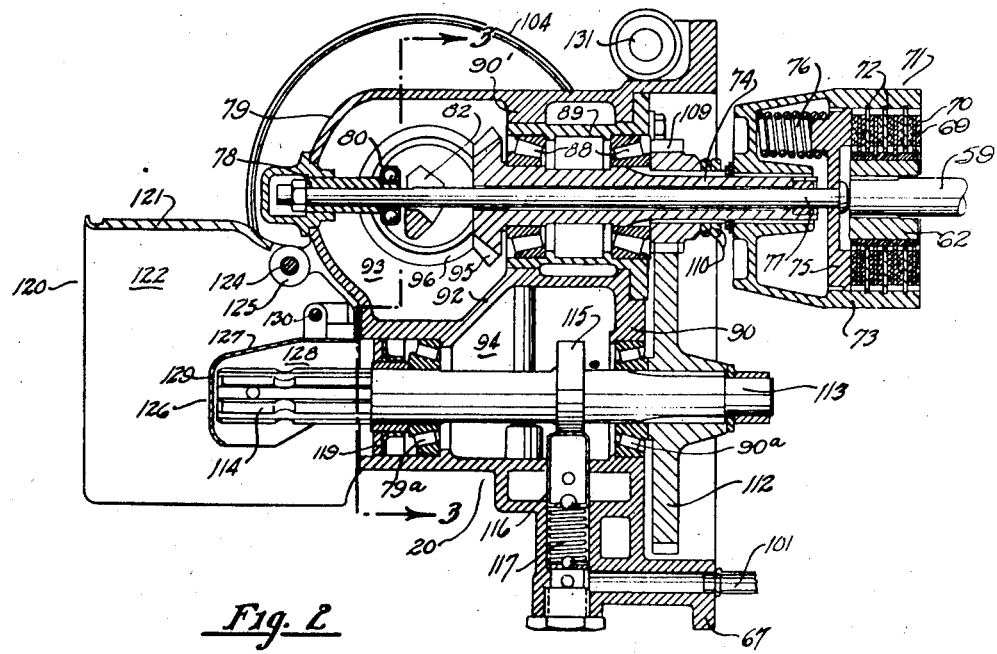
Figure 2 is a longitudinal sectional elevation, on an enlarged scale of the rear or power takeoff section of a tractor similar to that shown in Figure 1.
Figure 3:
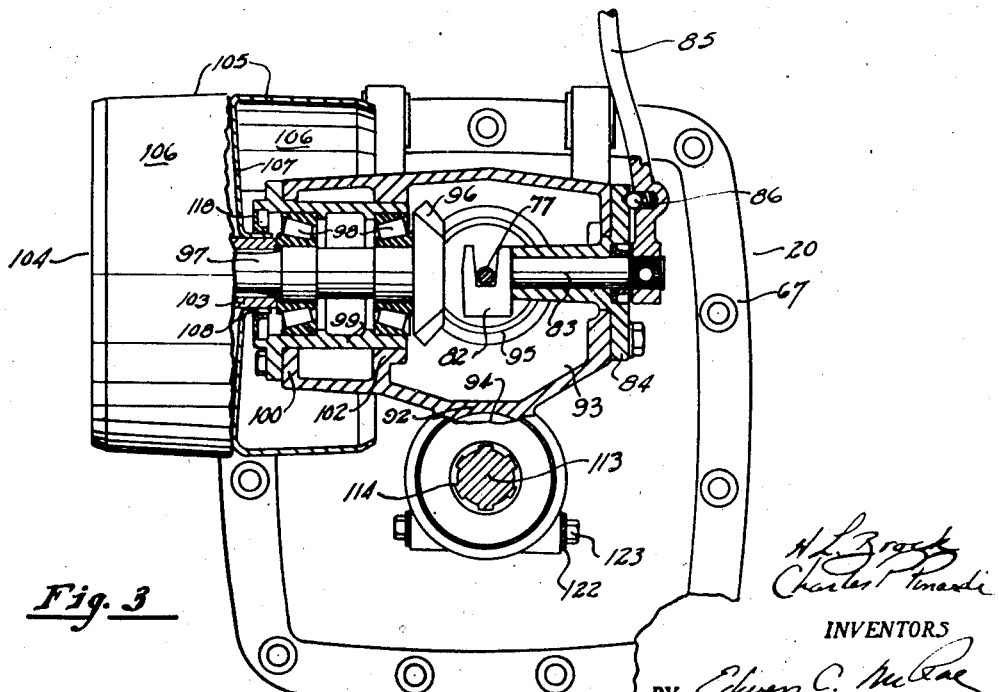
Figure 3 is a rear view of the power takeoff section taken approximately on the line 3—3 of Figure 2.

Reference is now made to Figures 2 and 3, which show the power takeoff section 20 on an enlarged scale and in further detail—it being understood that the forward flanges 67 of this section are bolted to the rear flange 68 of the axle section. As noted above, the power takeoff drive shaft 59 terminates in the clutch block 62 of the power takeoff clutch 71 to which it is splined and which carries the clutch plates 69 having friction facings 70. These plates cooperate with the driven clutch plates 72, which are secured to the clutch housing 73 which, in turn, is splined to the end of the primary shaft 74. A clutch actuator 75 is slidably mounted within the clutch housing 73 and a spring 76 normally forces the plates 72 and 69 into operative engagement transmitting the drive from the power takeoff drive shaft 59 to the primary shaft 74.

It will be noted that the primary shaft 74 is hollow and slidably receives the actuating rod 77, which is secured to the clutch actuator 75 at its forward end and slidably journaled at its rearward end in a bearing 78 supported in the rear face 79 of the power takeoff section 20. Associated with this rod is a bearing 80 which cooperates with the forked cam 82 mounted on the transverse shaft 83 journaled in a sidewall 84 of the power takeoff section 20. A control lever 85 is secured to the outer ends of the transverse shaft 83 and includes a spring loaded detent 86 which serves to keep it in one of two possible positions of engagement. In one such position, shown in Figure 2, the power takeoff clutch 71 is engaged and the rotation of the power takeoff drive shaft 59 is transmitted directly to the primary shaft 74. In the other position, the actuating rod 77 is withdrawn rearwardly against the pressure of the spring 76 and releases the clutch actuator 75 terminating any frictional engagement between the plates 69 and 72, in which case the primary shaft 74 is no longer driven. The control lever 85, as best shown in Figure 1, is readily available for operation from the driver's seat or a lanyard may be attached to the ring 87 at its outer end and the clutch operated by one riding a following implement or from other points rearwardly of the tractor itself.

The primary shaft 74 is journaled in bearings 88 supported in a sleeve or housing 89 which, in turn, is received in the forward transverse web 90 of the power takeoff section 20 and an intermediate transverse web 90' disposed above the substantially longitudinal partition 92 which divides the section into a gear chamber 93 and pump chamber 94. The shaft 74 terminates in a bevel gear 95 within the chamber 93 which drivingly engages a similar gear 96, attached to the transverse shaft 97. This latter shaft is journaled in bearings 98 received in the housing 99 which, in turn, is supported in a sidewall 100 of the power takeoff section 20 and a longitudinal vertical partition 102. The outer end of the transverse shaft 97 is secured to the hub 103 of the belt pulley 104. It will be noted that this pulley is formed from two similar stampings 105, each having a substantially cylindrical wall 106 and a substantially flat base 107 terminating in a central flange 108, which is secured to the hub 103.

The primary shaft 74 also carries a pinion 109 held in place by nuts 110 and meshing with the gear 112 secured to the forward end of the power takeoff shaft or secondary shaft 113 which is parallel with the shaft 74 and journaled in bearings 90ᵃ and 79ᵃ in the web 90 and in the rear face 79, respectively, of the power takeoff section 20, as shown in Fig. 2. The externally extending end 114 of the secondary shaft 113 is splined for the attachment of a universal joint or other appropriate power connection (not shown). A cam 115 is formed on the shaft 113 and operates the piston 116 of an oil pump 117 used to circulate oil to the various bearings referred to. The pump 117 is supplied with oil from the tractor sump through the pipe 101. Oil seals 118 and 119 on the transverse shaft 97 and the secondary shaft 113, respectively, prevent leakage from the chambers 93 and 94, respectively.

Attached to the rear end of the power takeoff section 20 is an outer guard 120 (see Figures 1 and 2) in the form of a hood having a closed top 121 and sides 122 and open rearwardly and downwardly. This guard is pivotally mounted on the bolts 123 (see Figure 3) on the section 20 and is secured in the position shown in Figure 2 by a removable pin 124, which engages the guard 120 and an eye 125 formed on the section 20. An inner guard 126 having a closed top 127, sides 128 and end 129 and being open at the bottom is pivotally supported at the hinge 130 also secured to the section 20. The details and operation of this construction are explained more fully in the application of Brock et al. for "Power takeoff for tractors," S. N. 570,293, filed December 29, 1944. It is sufficient to note here that for drive from the takeoff shaft, the inner guard 126 is pivoted upwardly on the hinge 130 to permit the attachment of a universal joint to the shaft 113 and the outer guard 120 then covers this connection and prevents injury from it. However, when the belt drive is to be used, the large outer guard 120, having a flaring outer end, interferes. The pin 124 is then withdrawn and the guard 120 pivots downwardly about the bolt 123 to clear the belt. The inner guard 126 is then dropped into the position shown which securely covers the now unused power takeoff shaft. This is necessary since both the belt pulley and power takeoff shaft rotate simultaneously. In the preferred embodiment, small lugs are formed on the interior of the outer guard 120, which engage the inner guard so that when the outer guard is in the position shown in Figure 2, the inner guard will be raised to clear the shaft and when the outer guard is dropped, the inner guard will assume the position shown in Figure 2. However, this is not detailed in these drawings.

As explained above, the principal advantage of the present construction is that it provides at all times a direct drive from the engine to the various power takeoff devices, while the latter are in operation. Thus, the fluctuations in rotational speed at the main clutch or transmission are not reflected in the operation of the power takeoff; and any device driven thereby is operated at a substantial constant rotational speed. In addition, the entire takeoff device, both as to the belt pulley and the takeoff shaft and their associated clutch and its control, form a single compact unit which may be applied to tractors of those desiring such facilities or may be replaced by a simple cover plate bolted to the rear flanges 68 of the axle section 19 when this accessory is not desired. Such a plate would, of course, include the fulcrum 131 for the hydraulic control but would otherwise serve merely as a cover at the end of the tubular section. It is thus possible to apply or remove the power takeoff unit without affecting the operation of the remainder of the tractor. To effect this, the power takeoff unit is removed bodily and the power takeoff drive shaft 59 is withdrawn longitudinally rearwardly from engagement with the engine crankshaft. A cover plate (not shown) is then bolted to the flanges 68 to close the opening in the axle section 19. The tractor then functions in the normal manner, the engine torque drive being applied only through the drive tube 26 to the transmission and thence to the wheels. To facilitate this interchange, the independent oil pump 117 is also included in the power takeoff unit, so that it may be operated without reliance upon the lubrication facilities provided elsewhere on the tractor. The only connection required is a suction lead to the main sump.

Some changes may be made in the arrangement, construction, and combination of the various parts of the improved device, without departing from the spirit of the invention and it is the intention to cover by the claim such changes as may reasonably be included within the scope thereof.

The invention claimed is:

A power takeoff unit, comprising: a housing having a mounting flange at one end thereof; partition means in said housing dividing the same into a gear chamber and a pump chamber; an operating shaft journaled in said gear chamber and having one end projecting forwardly from said housing; a transverse shaft journaled in said gear chamber and having one end thereof projecting externally of said housing; means effecting a driving connection between said transverse and operating shafts; a clutch mounted on the forward end of said operating shaft including an element connected with said operating shaft and another element adapted to be connected with a driving shaft of a power source; means normally urging said clutch elements into driving engagement; means for effecting disengagement of said clutch elements; a power takeoff shaft journaled in said pump chamber and having its rear end projecting rearwardly of said housing; means drivingly interconnecting said operating shaft with said power takeoff shaft; a lubricant pump in said pump chamber; and means on said power takeoff shaft arranged to actuate said pump.

CHARLES P. PINARDI.
HAROLD L. BROCK.

REFERENCES CITED

The following references are of record in the file of this patent:

UNITED STATES PATENTS

| Number | Name | Date |
| --- | --- | --- |
| 1,881,609 | Huwe | Oct. 11, 1932 |
| 2,140,687 | Brown | Dec. 20, 1938 |
| 2,168,033 | Johnston et al. | Aug. 1, 1939 |
| 2,287,302 | Gifford et al. | June 23, 1942 |
| 2,317,957 | Frudden | Apr. 27, 1943 |
| 2,347,352 | Lapsley | Apr. 25, 1944 |
| 2,349,880 | Orelind | May 30, 1944 |
| 2,352,270 | Land et al. | June 27, 1944 |